(12) United States Patent
Rolfe

(10) Patent No.: US 9,614,845 B2
(45) Date of Patent: Apr. 4, 2017

(54) ANONYMOUS AUTHENTICATION AND REMOTE WIRELESS TOKEN ACCESS

(71) Applicant: AUTHENTIFY, INC., Chicago, IL (US)

(72) Inventor: Andrew Robert Rolfe, Deerfield, IL (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 14/687,327

(22) Filed: Apr. 15, 2015

(65) Prior Publication Data

US 2016/0308862 A1    Oct. 20, 2016

(51) Int. Cl.
*H04L 29/06* (2006.01)
*H04L 9/32* (2006.01)

(52) U.S. Cl.
CPC ........ *H04L 63/0876* (2013.01); *H04L 9/3242* (2013.01); *H04L 63/0428* (2013.01); *H04L 2209/24* (2013.01)

(58) Field of Classification Search
CPC ............... H04L 63/0876; H04L 9/3242; H04L 63/0428; H04L 2209/24
USPC ........................................................ 713/168
See application file for complete search history.

(56) References Cited

U.S. PATENT DOCUMENTS

| | | | | |
|---|---|---|---|---|
| 8,494,576 B1 * | 7/2013 | Bye | .................... | G07C 9/00087 455/403 |
| 2009/0265775 A1 * | 10/2009 | Wisely | ................ | H04L 63/0492 726/9 |
| 2012/0150687 A1 * | 6/2012 | Hart | .................... | G06Q 30/0613 705/26.41 |

* cited by examiner

*Primary Examiner* — Mohammad W Reza
(74) *Attorney, Agent, or Firm* — Kilpatrick Townsend & Stockton LLP

(57) ABSTRACT

Provided is a method for operating an authentication server for authenticating a user who is communicating with an enterprise via a network. The method include receiving, via the network, a first authenticator including first information from a low energy wireless device received via a user device wirelessly, and storing the first authenticator. When the authentication service later receives, from the enterprise, a request to authenticate the user, the authentication server transmits an authentication request to the user device via the network requesting that the user read information from the low energy wireless device using the user device. The information received from the low energy wireless device in response to the authentication request is then used authenticate the user by comparing the information received from the low energy wireless device due to the authentication request with the stored first authenticator.

17 Claims, 5 Drawing Sheets

ANONYMOUS AUTHENTICATION AND REMOTE WIRELESS TOKEN ACCESS

TECHNICAL FIELD

This invention relates to security and privacy. More particularly it relates to authentication and/or authorization performed via a communications network based on user credentials and/or other authenticators.

BACKGROUND

1. Authentication and Identification

User authentication techniques, such as those relying on conventional passwords, one time passwords (OTPs), or hardware or software smartcards, etc., have all too often proven to be either too weak and susceptible to attacks, such as man in the middle (MITM) or man in the browser (MITB) attacks, or too cumbersome and expensive. The use of single sign on techniques such as OpenID, FaceBook Connect, etc., only make the problem worse, as once the attacker has compromised the master account, the attacker can access all other accounts that rely on the initial login. Further, the focus of attackers has shifted from trying to break the login process to using sophisticated techniques to come in after the user has logged-in and attacking transactions as they are being performed. This has made transaction authentication, the act of confirming if the transaction seen at the back end web server is identical to that intended by the user, even more important.

When considering authentication, one must necessarily consider identification. An important concept when considering identification is that each one us is a single person—a single carbon based unit. We have one identity in reality, but in the digital world we tend to have multiple digital representations of identity with multiple enterprises—a Facebook™ identity, an Amazon™ identity, multiple banking identities (mortgage, savings account, etc.), and so on. So each of us has multiple digital identities and each of these enterprises has a responsibility to manage these identities and to verify that the users of their system are the correct intended user. Additionally, different enterprises have different responsibilities. Banks and other financial institutions, for example, have a regulatory responsibility—to know their customers. They are required to a certain degree to know that you are correctly identified. Other enterprises, such as Facebook™, are not so much concerned with your identity for regulatory purposes, but because they want to share your information with other users—their need to identify is different. So each of these enterprises has a different set of what is essentially identity attributes about you in their database and they use these attributes of your identity to verify that you are who you say you are when you use the services provided by the enterprise.

It is common for most enterprises to require that a user select a user name and password, often referred to as user credentials, at the time the user establishes a relationship with the enterprise. These are shared secrets for subsequent use by the enterprise to verify you are who you say you are when accessing the enterprise website. However, banks and other financial institutions may require more. These institutions often require additional credentials, such as a social security number or some other personal information. That is, banks and other financial institutions typically subject you to more careful examination or scrutiny by requesting other identity related information, which are also often referred to as user credentials, when you initially establish a relationship with the institution, but thereafter rely primarily on your user name and password, and only secondarily on such other identity related information, to verify that you are who you say you are, i.e. to verify your identity, when accessing the institution's website.

Enterprises can also utilize information about what you possess (a credit card, a key, a token, etc.) to verify your identity. A bank issues you a credit or debit card, and can ask for the account number and other information associated with the card, to verify you still possess it. Some cards and tokens have computing capabilities built-in, and can generate unique values when challenged. Those knowledgeable in the art know that this often comes in the form of sending a random value to the token, and the token then cryptographically signs that random value using a private key stored on the token. When the token was issued, the matching public key was stored in association with the identity information of the user who was issued the token. When a token is challenged, the challenger can cryptographically verify which private key was used to sign the random value, and therefore verify the website visitor has possession, in real-time, of the token. By association then, the website could assume the visitor is the same person who was issued the token. A thief could steal the token however and potentially be inappropriately identified.

Thus, each enterprise has digital data that represents the shared secrets and/or information about a user that the enterprise uses to verify that specific user's identity. Because most users deal with multiple enterprises, an individual user is required to have many user names and passwords, each associated with an established enterprise relationship. Often, to simply a user's life, they will choose the same password or other shared secret for every enterprise.

However, under the models of authentication discussed above, when security is compromised, the identity of the user and the credentials used to authenticate the user, e.g., passwords, social security number, credit card information, etc., can be stolen and used to impersonate the user to the enterprise. This is because the identity of the user and the user's credentials are both maintained by the applicable enterprise. The compromise escalates if the same password from the compromised enterprise can be used to authenticate at a different enterprise.

Therefore, a successful attack on the enterprise can, and indeed has, resulted in not only a breach of the user's credentials, but also of the user's identity. That is, in a single attack, attackers have been able to steal not only the user's credentials used for a particular enterprise, but also the user's identity information which the enterprise associates with those credentials. Thus, if someone attacks one enterprise's information, they can get both the user's identity and the user's credentials, possibly allowing the attacker to impersonate the user at multiple enterprises, which is a catastrophic loss.

2. Shared User Credentials

Each enterprise requires a different level of trust or confidence in the authentication of its users. Each has its own policies and criteria established with respect to authentication. In the banking world authentication policy and criteria are based on risk management. What type of device is the user using? Has the user ever paid this payee before? What's the dollar amount of the transaction, etc. Accordingly, if a user wants to move $5000.00, the bank website is going to prompt the user for a different credential, or additional credentials to provide a higher level of trust for the authentication, than it would if the user wanted to move only $10.00.

Additionally, an enterprise may want to utilize various credentials and other authenticators for the authentication and authorization process in a variety of different ways. This means that there is essentially a matrix of possibilities: using different categories of authenticators that represent something you have (i.e. something in your possession), something you know (something within your knowledge), and/or something you are (your biometric). Furthermore, the enterprise may have multiple choices within each one of those categories. Something you have could be a phone or access to a phone call, or smart card, or token. Something you know could be your mother's maiden name, your password, your preselected gesture or pattern, or which picture is the one that you chose when you logged in or when you set up the account. Something you are, could be your fingerprint, your voice pattern, your face or some other biometric. Consequently, there are numerous possible authenticators that can be used for authentication.

Each type of authenticator has its strengths and weaknesses. An authenticator which verifies knowledge, like a password or shared secret, costs nothing, can be easily replaced, but must be memorized and can be stolen. An authenticator which verifies procession, like a key or token, does not have to be memorized, can be cryptographically challenged, but can be lost or stolen. A biometric authenticator requires human interaction to capture a human attribute and therefore verifies a human is involved, cannot be lost by the user, but requires special equipment to be sampled, and to ensure the sample is from a live human to avoid replay or spoofing. That is why high security applications usually require use of multiple types of authenticators (also described as multiple factors of authentication).

There are also numerous ways to receive and sample these authenticators. As technology advances, devices evolve and today many users have multiple different devices, each with different capabilities, and thus, a myriad of potential authenticators at their disposal. The problem is that each user may utilize multiple different devices at different times or even at the same time, and different users may utilize different devices with different capabilities. Furthermore, users will upgrade their devices at a different times, unbeknownst to the enterprise. Thus, it is an arduous task for the banks, and other enterprises, to keep a valid profile for every user—it is a challenge for every user to continuously inform each enterprise of their new/upgraded devices, its capabilities, and thus, the potential authenticators available for authenticating the user.

3. Usage of Wireless Credential Devices—Access & Emulation

Today, if you look at certain credit cards, subway cards or other payment cards that can be used to pay for products or services, you will see a symbol that looks like a speaker. That symbol indicates that the card supports Near Field Communications (NFC), which are commonly referred to as NFC readable devices. Such NFC readable cards can be tapped on a NFC enabled point-of-sale (POS) terminal, and the POS terminal will read the desired information (e.g. credit card number and expiration date, or value remaining on a subway card etc.) off the card wirelessly. Additionally, smartphones are now enabled with NFC capabilities—they can act as an NFC readable device and can also read NFC readable devices. Accordingly, if you have an NFC enabled smartphone, you can tap an NFC readable card on your phone, the phone, like a POS terminal, can read it wirelessly. NFC enabled devices, including NFC enabled POS terminals and smartphones, are sometimes referred to as NFC readers. Thus, with NFC readable cards it is no longer necessary for the user to copy the information from the card into a website purchase form, or to physically insert the card into a POS terminal or to swipe the card's magnetic stripe. Instead, all that is required is that the card be tapped against an NFC reader and the NFC reader communicates wirelessly with the card to gather the desired information from the card.

Additionally, authentication tokens, such as RSA secure ID tokens, are in common usage, with some banks offering these tokens to their end user customers—typically high valued end user customers. In order to convince a customer to utilize such tokens, the bank might say to the end user, if you really want to protect your high dollar account, we will send you one of these tokens and you will have to use it to log-in in order to access your account. These authentication tokens can be wirelessly readable as well, via many different wireless communication methods like NFC, BLE (Bluetooth Low Energy), and others available now or in the future. Thus, it would be beneficial if the expanding usage of these wirelessly readable devices in concert with smartphones and other devices could somehow be utilized to provide even stronger authentication and verification. These devices are also referred to herein as low energy wireless devices—they do not require much energy and must be proximate to the device with which they are communicating.

SUMMARY

According to a certain aspect of the invention, a user transacting with an enterprise can be authenticated using a user device in combination with a low energy wireless device, including but not limited to devices configured to use near field communications, Bluetooth communications and Bluetooth low energy communications. To accomplish this, an authentication service receives, using a network, a first authenticator that comprises information read from a low energy wireless device and stores the first authenticator. Later, when the user is engaging the enterprise to conduct some sort of transaction, the enterprise sends a request via the network to the authentication service to authenticate the user via the user device. The authentication service identifies the user device and transmits a request to the device requesting that the user use the device to read information from the low energy wireless device, such as an NFC enabled smartcard. That is, a request is sent for the first authenticator. After reading the information, the user device sends the information, which may be encrypted, to the authentication service. The authentication service compares the received information to the stored information to verify whether the user has provided the necessary authenticator As the authentication service is only using the information to verify or authenticate the user, the content of the information itself is not important. To authenticate, the information need only match the stored information. Thus, to provide for security and privacy of the user's information, the information received from the low energy wireless device may be hashed and stored as a hashed value. The information later received for authenticating the user is then hashed and the hashed values are compared to authenticate the user.

According to another aspect, the authentication service may also authenticate the user using a different credential before requesting the information from the low energy wireless device. This is accomplished by using other authenticators enrolled with the authentication service. That is, the authentication service receives another authenticator from the user device and stores this authenticator. This second authenticator may be a biometric (fingerprint), a password, or a pattern, etc. Here, this second authenticator is received from the user device and stored with the authentication service for use in later transactions. When the user transacts with the enterprise and the enterprise is requesting authentication, the authentication service requests the second authenticator. After receiving the second authenticator and validating the authenticator, the authentication service sends a request to the user device requesting the information from the low energy wireless device.

According to another aspect of the invention, a user transacting with an enterprise can be authenticated and exchange information with the enterprise from a low energy wireless device using the user device via the authentication service in a secure manner. When transacting with a user, an enterprise may require information from a low energy wireless device. To accomplish this using the authentication service, the enterprise sends a request to the authentication service to obtain information from the low energy wireless device. The authentication service identifies a user device associated with the user and sends a request to the user device for information from the low energy wireless device, such as an NFC smart card. The user device reads the information from the low energy wireless device, encrypts the information, and transmits the encrypted information to the authentication service. The authentication service then relays the information to the enterprise in encrypted form. This information may be encrypted using a key pair where each of the user device and the enterprise privately holds one key of the key pair. This key pair may be an asymmetric key pair where each of the user device and the enterprise each store a different key of the asymmetric key pair. Because the authentication service does not have either of the keys, the information may be securely relayed between the user device and the enterprise without permitting the authentication service access to the information.

Additionally, information may be relayed to the low energy wireless device from the enterprise using the authentication service to be encrypted by the low energy wireless device. This information may be encrypted so that only the issuer of the low energy wireless device can decrypt the encrypted information. This encrypted information is transmitted back to the enterprise via the authentication service. If the enterprise is not the issuer of the low energy wireless device used to encrypt the information, the enterprise may transmit this encrypted information with the unencrypted information originally transmitted to the user device to the issuer who will then decrypt the information and compare to the information originally transmitted to ensure the communications have not been compromised.

Another aspect of the invention provides for additional authentication of a user before obtaining information from the low energy wireless device using the user device. Using authenticators for authenticating the user through the user device stored with the authentication service, the authentication service requests an authenticator, such as a biometric, from the user device. After receiving the authenticator, the authentication service compares the receive authenticator to the stored authenticator. Only after the user is properly authenticated does the authentication service transmit the request to obtain information from the low energy wireless device to the user device.

Another aspect of the invention relates to establishing multiple relationships between the entities. This includes establishing an enterprise account between the enterprise and the authentication service and identifying this relationship with an enterprise account identifier. A key pair may be generated for encrypting information exchanged between the enterprise and the authentication service to provide for secure connections between these entities. Another relationship is also established between the user and the enterprise, which is identified using a user identifier to identify the user. Also, a relationship is established between each user device and the authentication service and each of these relationships are identified by a different device identifier. Thus, a particular user may have multiple devices set up in the user account. The user enrolls authenticators through each user device, or a single authenticator across multiple devices, depending upon the capabilities of each device, and these enrolled credentials are associated with the user identifier and optionally with the device identifier through which they are enrolled. Additionally, the authentication service generates a key pair and transmits one key to the user device and stores the other key of the key pair. This may be an asymmetric key pair. These keys are used to encrypt and decrypt information transmitted between the corresponding user device and the authentication service to ensure secure communications.

After establishing these relationships, a relationship may be established between the enterprise and a particular user device. This relationship is established using the authentication service. The authentication service generates a relationship identifier that associates the user device identifier with the enterprise account identifier. The relationship identifier is stored and transmitted to the user device. As a part of this process, the user device generates a key pair, stores one key of the key pair and transmits the other key of the key pair with the relationship identifier to the enterprise through the authentication service using the network. The other key is transmitted with the relationship identifier so that the enterprise knows which key to use for encrypting/decrypting when communicating with a particular user device using the authentication service via the network.

It is perhaps worthwhile to emphasize here that it should be understood that the term "network" is used herein generically to refer to a digital communications network, where the public Internet, local area networks, or private secure networks are some exemplary types. Many of the implementations of this invention will utilize a single type of network for all communication channels, e.g. the Internet, while other implementations can use multiple different network types for different channels (for example the "network" may include multiple different type networks with one channel provided via a private type network, on another channel is provided via the Internet). Thus, it will also be understood that the invention does not require the various different communication channels to be provided via any particular type of network or via the same network type. However, describe herein the preferred implementation uses different secure channels between different pairs of entities.

It should also be understood that the method will typically be implemented by a server having one or more ports through which it communicates via the network and the processor with the program logic, typically but not necessarily executable software, to perform as described above. One or more exemplary embodiments may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for one or more embodiments of the present disclosure or may be well known to one of ordinary skill in the art.

Examples of the computer-readable recording medium include magnetic media including hard disks, magnetic tapes, and floppy disks, optical media including CD-ROMs and DVDs, magneto-optical media including floptical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. Furthermore, it is understood that one or more of the above-described elements may be implemented as hardware (e.g., circuitry, at least one processor, memory, data lines, etc.), software, or a combination of hardware and software.

BRIEF DESCRIPTION OF THE DRAWINGS

The above and other objects, features, and advantages of the present invention will become more readily apparent from the following detailed description of exemplary embodiments of the invention, taken in conjunction with the accompanying drawings, in which.

DETAILED DESCRIPTION OF THE INVENTION

Figure 1:
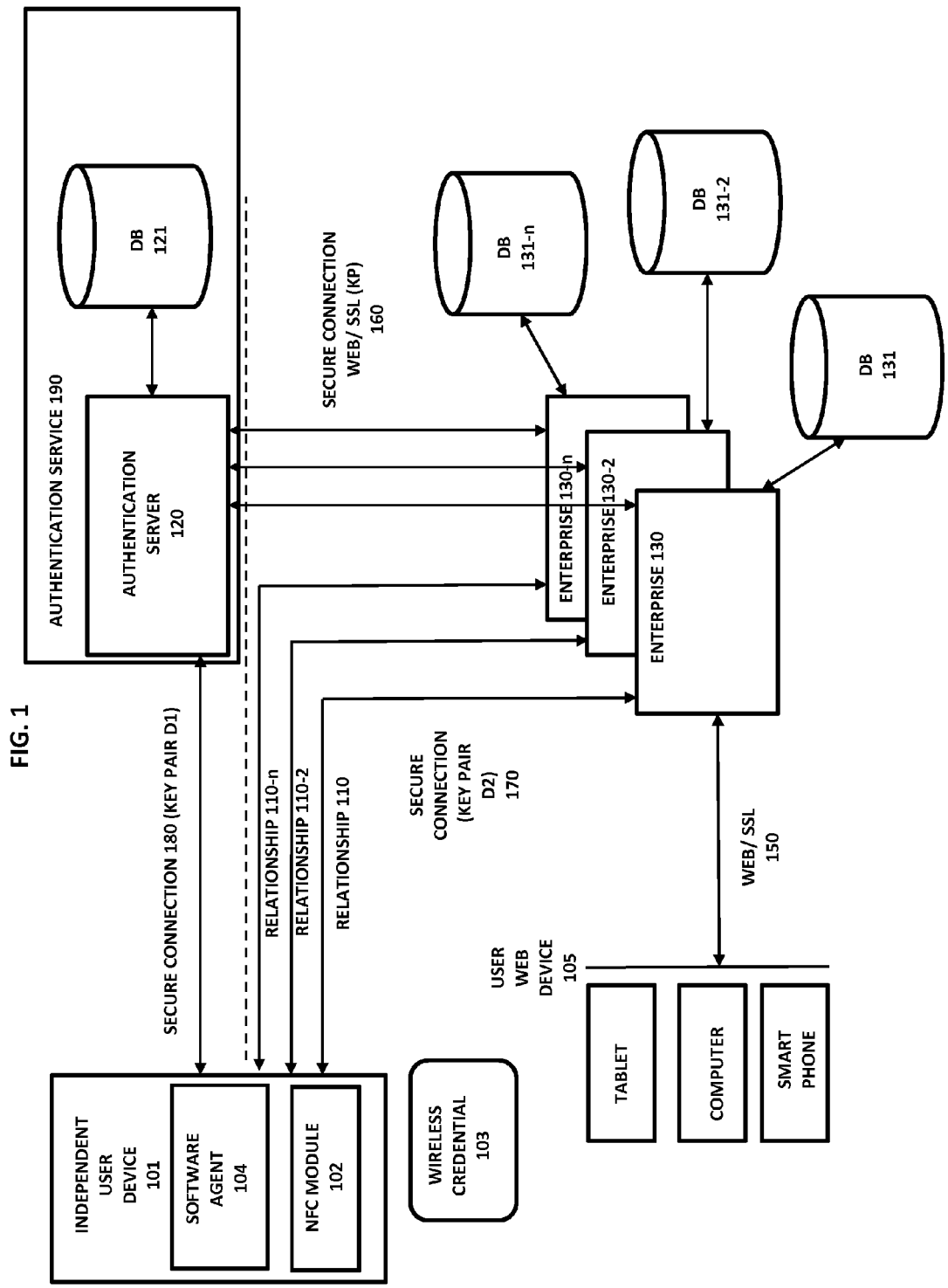
FIG. 1 shows the main components of an authentication system between a user and an enterprise.

Exemplary embodiments will now be described more fully with reference to the accompanying drawings. The exemplary embodiments, however, may be embodied in many different forms and should not be construed as being limited to the embodiments set forth herein; rather, these exemplary embodiments are provided so that this disclosure will be thorough and complete, and will fully convey the concept of the disclosure to those skilled in the art. In the drawings, the size of the various components may be exaggerated for clarity. Like reference numerals in the drawings denote like elements, and thus their description will be omitted.

I. Authentication System Architecture

1. Independent Channel Concept

One aspect of the invention relates to a system which separates these credentials from the identity using an authentication system that anonymizes the transactions used to authenticate a user. The authentication system stores credentials and verifies that the user can present those credentials in a repeated way. The greater the number of identifiers or credentials for a particular user increases the degree of trust that the correct person is being authenticated. For example, if only a password is used the trust is low, whereas if a password, the identity of the user's network device (e.g. smartphone), and a user's biometric (e.g. fingerprint) imaged or otherwise detected by the phone are all used, there is a high level of trust and confidence that the person intended to be authenticated is the person actually authenticated. Thus, even though the authentication system does not know the particular identity of the user, it can provide a high level of confidence that it has authenticated the person associated with a particular set of credentials.

According to this aspect of the present invention, all of the authenticators and devices for a user are aggregated on the authentication server side in an account without the true identity of the user—that is the authenticators and device identifiers are saved anonymously. A particular user may have three different devices and six different authenticators, which are managed in the authentication server to enable authentication of the user. However, to the authentication server the user is simply a person, i.e. a carbon based unit, who provided all of these authenticators, and the authentication server can authenticate that same person through any of the applicable user network devices in the future— without knowing the user's true identity. To accomplish this, four bindings are created: one between the applicable user network device and the authentication service; a second between the user and the authentication service, where the user's authentication credentials are stored; a third binding between a device and its user, as recognized by the authentication service, to an account and identity at an enterprise; and a fourth binding between the enterprise and the authentication service to provide secure access to the user network device and to request user credential verification.

By anonymously aggregating a user's credentials in an authentication service, a person, i.e. a user, now owns his or her credentials. The enterprises, such as banks, can take advantage of them by utilizing the services of the authentication service, but they do not own the user's credentials anymore. The fact that all of this credential information is stored (at the authentication service) separate from the identity information (at the enterprise), provides a privacy and security barrier, and allows centralized management (creation, revocation, renewal, deletion, upgrading) of the credentials. If the user decides to upgrade his device, to one which now for example allows retinal scanning, a new credential can be created at the authentication service once, and that new credential can be utilized by all enterprises using the service. If an attacker hacks into the authentication service, the attacker may gain access to credentials, but does not know which user's identity it is associated with. If an attacker hacks into the enterprise, the attacker can get some identity information, but can get no credentials.

The authentication architecture and the process for developing this system are described with reference to FIGS. 1 and 2. The figures show a process for establishing the secure connections and bindings, with each column identifying an actor, the vertical direction being a sequence in time and the horizontal showing communications between actors.

An important feature in the present authentication system architecture is the concept of breaking authentication from identification and providing multiple secure connections. This is important because it provides for improved privacy and permits anonymizing the transactions. The system is built of three separate and secure communication channel bindings, each binding established between two different entities (the authentication service 190 and the user device 101, the user device 101 and the enterprise 130, and the enterprise 130 and the authentication service 190). These bindings are built on secure connections and configured such that no single compromise of one link, channel or binding compromises the entire system. The design is intended to withstand a break into the authentication service 190, without fully breaking the security model, a break into the enterprise 130 without fully breaking the security model, and a compromise to the user device 101 without fully breaking the security model.

As shown in FIG. 1, the authentication service 190 is capable of communicating with multiple enterprises 130, 130-2 . . . 130-n. However, for purposes of explanation, this following description is limited to a single enterprise 130. Additionally, the authentication service 190 and each enterprise 130 can have relationships with multiple users. Thus, the system described below may be implemented as a shared service or separately for each enterprise.

In this embodiment, there are three sets of keys, to support three secure connections, one corresponding to each binding. The first is a secure connection between the enterprise customer and the authentication service. In this example, this is a secure connection 160 between a customer (enterprise 130) and the authentication service (authentication server 120). This secure connection 160 could be as simple as SSL or it could be a mutually authenticated connection.

The second secured connection is created between the independent user device 101 and the authentication server 120. This connection may be established through, for example, a mobile device using a downloaded application or software agent 140. The independent user device 101 communicates using a network connection and contains software capable of executing various cryptographic techniques (encryption/decryption). This connection is used to securely communicate to the authentication server 120 to enroll and verify user credentials, such as a password, voice biometric and/or fingerprint, but does require the identity of the user. Thus, the dotted line in FIG. 1 represents a line of privacy. The authentication server 120 does not know the true identity of the user, but knows the user is the same human being who enrolled the credentials. When that enrollment to the authentication service gets created, the binding is establishing between the authentication server 120 and the independent user device 101. An asymmetric key pair D1 (PK1/PK1') is created 211 with one key PK1 stored 215 on the independent user device 101 and the matching key PK1' stored at the authentication service 190. In this embodiment, the key pair D1 (PK1, PK1') is created, but neither of the keys PK1, PK1' are made public—no certificate authority holds one of the keys PK1 or PK1'. This key pair is established between the authentication service 190 and the user device, generated using software at the authentication service.

The third secure connection 170 is established between the user device 101 and the enterprise 130 using the authentication service 190. This connection is secured using a second asymmetric key pair D2 (PK2/PK2') established between the user device 101 and the enterprise 130. This key pair D2 is generated by the user device 101, and one key PK2 is stored on the independent user device, and the matching key PK2' is stored at the enterprise, and associated with the user and the associated device.

Figure 2:
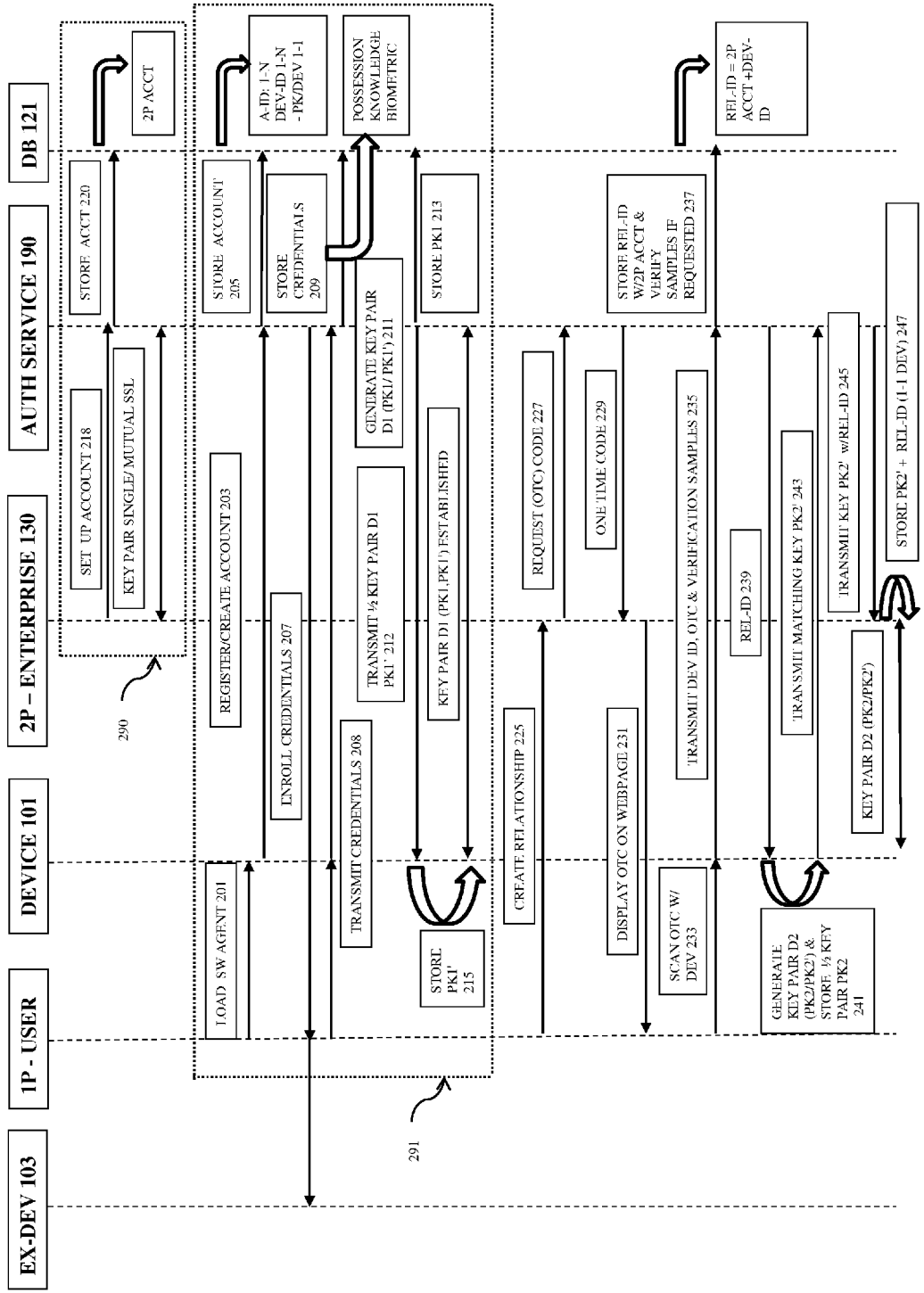
FIG. 2 shows a process for setting up secure relationships within the authentication system.

FIGS. 1-2 show a system and process for establishing and using an authentication system in accord with a first embodiment.

First, the process for establishing a relationship 290 between the enterprise 130 and the authentication service 190 is described, followed by the process for establishing a relationship 291 between the user/user device 101 and the authentication service 190. It is noted that the relationships between the user/user device 101 and the authentication service 190, and the relationship between the enterprise 130 and the authentication service 190 need not be established in the order shown in FIG. 2. That is, the enterprise 130/ authentication service 190 relationship 290 may be established before or after the relationship 291 established between the user/user device 101 and the authentication service 190 (as shown in FIG. 2).

The user first downloads 201 a software agent 140 to the user device 101. This software agent may be an app downloaded from an application store or embodied in some other manner. The software agent is provided by the authentication service 190, but may be provided from another source, such as the enterprise. The software agent on the user device 101, creates 211 an asymmetric key pair D1 (PK1/PK1'). One key PK1' is transmitted to 212 and stored 213 at the authentication server (for example in the DB 131), and the matching key PK1 is stored 215 in the user device 101. The user agent also sends other information including a device ID (DEV-ID) to the authentication server 120 to register the device. This device ID identifies the device and the specific downloaded software running on the device to allow the specific device to be addressed and later receive communications from an enterprise. The authentication service 190 creates an account ID (A-ID) for the user and stores 205 the account with the device ID corresponding to the user device 101 at the server, for example in the database 121. If this is the first time the user has utilized the authentication service from any device, as part of this device registration process, the authentication service 190 also requests that the user enroll credentials 207. The credentials are used for authentication of the human being (not the device) and may include biometric authenticators (B) (fingerprint, voice, facial recognition), possession authenticators (P) (mobile phone, NFC smart card, Bluetooth device) and knowledge based authenticators (K) (passwords, patterns, social security number). These credentials are collected though the device 101 and the user can select which credentials to enroll based on the device capabilities and the user's preference. For example, the user may provide a fingerprint sample, voice sample or facial recognition sample by collecting these credentials using the device 101. These credential samples are then transmitted to 208 back to the authentication service 190 and stored 209 in association with the account ID.

In some instances, the user device 101 may not be configured to transmit certain credentials to the authentication service 190. For example, a smartphone may be configured to sample a fingerprint and verify that this fingerprint belongs to the user of the smart phone, but in view of security concerns, the smartphone may not transmit the fingerprint attributes. In this instance, the credential relating to the fingerprint biometric may merely be stored in a manner to indicate that user device 101 is capable of obtaining and verifying a fingerprint sample. When verifying the user credential of the fingerprint during an authentication process the user device 101 with would then just transmit a message indicating, "fingerprint verified", back to the authentication service 190.

Next, the establishment of a relationship between the enterprise 130 and the authentication service 190 is described. The exact nature of the relationship establishment is not directly pertinent to this invention. What is important is the authentication service 190 sets up an account and stores 220 an account ID (2P ACCT) for each enterprise 130 in a way that the authentication service can ensure secure communications to and from the enterprise, and it can verify the enterprise account when receiving communications over the secure communications channel. For example, server side SSL or mutually authenticated SSL can be utilized between enterprise 130 and the authentication service 190 to implement such a secured channel.

Establishment of the third relationship, the relationship between the user/user device 101 and the enterprise 130, is described. One example of how such a relationship is established is the user goes to the enterprise 130 website to perform a transaction. The enterprise having a relationship with the authentication service, may inquire whether the user wishes to use the authentication service 190, or may require that the user use the authentication service 190 to perform certain transactions. The user then indicates the desire to create a relationship 225 with the enterprise 130 using the authentication service 190. At this point, it is not clear to the enterprise 130 whether the user has a relationship with the authentication service 190. Consequently, the enterprise 130 may query the user to determine if they have a device setup with the software agent. If not, the enterprise 130 can direct the user to establish a relationship using the relationship process 291

Prior to setting up a relationship with the user via the authentication service, it is important that the enterprise have confidence that the user meets the enterprises requirements for identity. The authentication service will verify it is the same human being, and the enterprise must verify the human matches their stored identity. It is left up to the enterprise to perform whatever due diligence is necessary, either at this point=immediately prior to the authentication service verifying the human, or immediately after.

When it is established that user has a device 101 setup with the software agent and intends to establish a relationship with the enterprise 130, the enterprise 130 queries the authentication service 190 for some type of one-time code (OTC) 227. As a part of this query, the enterprise can optionally specify which authentication credentials it requires the authentication service to utilize to authenticate the user. The method the enterprise uses to specify which credentials must be used can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best.

The authentication service 190 then generates the one-time code, which is typically globally unique number, and transmits 229 the one-time code 227 to the enterprise 130. The enterprise 130 receives the one-time code and provides it to the user 231 through its website or some other method. For example, the one-time code may be sent via SMS to the user or displayed on the webpage of the enterprise to be seen by the user. The one-time code may be sent or displayed as a user readable code, such as a number, to be entered by the user into the device 101, or sent or displayed as a device readable code (such as a QR code) to be captured via a camera or scanner within the device 101. To optionally authenticate the user who is inputting the OTC, the software agent on the device can perform authentication of the user based on the authentication credentials selected by the enterprise as part of the OTC query. These optional authentication samples, possible local authentication verification results, along with the OTC and the DEV-ID are then sent 235 by the software agent on the user device 101 over the secure channel 180 to the authentication server where the authentication service can verify the user and determine which enterprise requested this specific OTC. The purpose of this process is to have some sort of OTC associated with one enterprise, be input into the user device 101, in conjunction with optional user authentication, to provide a method to link the user and the device 101 to the enterprise 130.

Once this link is established, the authentication service 190 generates and stores 237 a relationship ID (REL-ID) that associates the device ID and user account (A-ID) of the user device 101 with the account ID (2P ACCT) of the enterprise 130. The authentication service 190 then pushes the relationship ID 239 to the device 101 through the secure connection 180. The user device 101, using the software agent, generates an asymmetric key pair D2 (PK2, PK2'), stores one key (PK2) 241, and transmits the other key (PK2') 243 over the secure connection 180 to the authentication service 190. The authentication service 190 does not store the other key PK2', but transmits 245 PK2' with the relationship ID (REL-ID) to the enterprise 130 over the secure connection 160. The enterprise 130 stores 247 the key PK2' with the relationship ID (REL-ID). This will be used to decrypt encrypted messages sent by the user device 101 –decrypt [encrypt [message] PK2] PK2'. This key pair enables the user device 101 and the enterprise 130 to send and receive encrypted messages between one another without permitting the authentication service 190 to decrypt these messages, thus providing enhanced security.

Once this secure communications channel 170 is established between the device and the enterprise, this is a second opportunity for the enterprise to verify the user's identity prior to trusting the relationship ID is truly bound to its user identity. If part of the identity information the enterprise can utilize for identity verification is of type possession, such as a wireless readable credential, the enterprise can attempt to read that credential while this device—enterprise secure connection 170 is established. To accomplish this, the enterprise can send a request to the authentication service over communications channel 160 to read a wireless credential via device 101, along with an encrypted message over secure communications channel 170 to be displayed on device 101, asking the user to present their credential so the device can read it. The software agent can utilize whatever wireless communications capabilities the device has to offer to read the wireless credential in the possession of the user, and transmit the contents of such credential back to the enterprise over the secure communications channel 170. The enterprise can then verify the content is as expected from its identity information, which then provides the enterprise more trust that the relationship ID truly matches the identity.

Thus, three secure connections are established. One secure connection is established between the user device 101 and the authentication service 190 over secure connection 180 using key pair D1. Another secure connection is established between enterprise 130 and the authentication service 190 over secure connection 160 using single or mutual SSL. The third secure connection is established between user device 101 and enterprise 130 over secure connection 170 using a key pair D2.

While the security established between the different channels is described using key pairs above, it is noted that different methods of providing secure channels may be used, those different methods providing secure communications may have a greater degree or lesser degree of security than the secure connections described above.

2. Separation of Identity and Privacy

Another aspect of this embodiment is the separation of authentication credentials and identity. If the identity and the credentials of a user are stolen, it is easy to emulate the user. By contrast, a user's credentials have virtually no value without the identity of the user. The dotted line in FIG. 1 represents this separation. The authentication service 190 knows the independent user device 101 via a device ID and it enrolls and stores the user credentials used to verify the user, but does not know the true identity of the person enrolling those credentials. The authentication service 190 associates those credentials with an account ID (A-ID) for the user associated with the user device 101. On the other hand, while the enterprise 130 is aware of who the user identity is, because they use the authentication service 190 to verify the user's credentials, the enterprise 120 is separated from the credentials used to verity the user.

In this system, to provide for enhanced security, the authentication service 190 does not have knowledge of a user's true identity. Instead, the authentication service 190 verifies the user based on enrolled credentials—without having any identity of the user. The authentication service 190 stores the user's credentials (for example in database 121) and verifies that the user can present those credentials in a repeated way. So, the more accurate the credentials or the greater the number of enrolled credentials provides a higher degree of trust that the user is the same person coming back through the device 101. For example, if the authentication service is just checking the password the trust is low. If the authentication service checks a password and it is received from a specific user device, the user has swiped a specific pattern on the screen and the user presents a fingerprint sample via the device—the trust is relatively high. If additional authenticators are added, such as new uses for NFC enabled devices, the result is a greater degree of trust that the real user is being authenticated.

So the authentication service 190 aggregates all of the authenticating credentials with an account ID (A-ID), and any number of corresponding user devices 101 via device IDs (DEV-ID). So, without having the user's true identity the authentication service 190 can verify a user, to a very accurate degree, is the same human being as was initially registered, utilizing any number of known devices.

3. Relationships and IDs

As noted above, in order to maintain anonymity of the user while permitting the user to engage with an enterprise and use the authentication service 190, multiple relationships are established. A relationship is established between the enterprise 130 and the authentication service 190 and stored as an account (2P ACCT-ID). Here, the identity of the enterprise 130 and the authentication service 190 is known. Another relationship is established between the user and the authentication service 190 and is stored as an account ID (A-ID). Another relationship is established between a user device 101 and the authentication service 190 and this is identified using a device ID (DEV-ID). This identifier (DEV-ID) also identifies the specific user device 101. In this instance, the authentication service 190 is not aware of the user's identification. Instead, the account ID (A-ID) is associated with a set of enrolled credentials, and one or more device IDs (DEV-ID). Finally, a relationship is established between the user device 101 and one or more enterprises 130-130-*n* as relationship IDs (REL-ID).

The account ID between the enterprise 130 in the authentication service 190 (2P ACCT-ID) is stored in the database 121 or similar persistent storage at the authentication service 190.

The account ID (A-ID) identifying the account between the user and the authentication service 190 is stored in the database 121 or similar persistent storage at the authentication service 190. This account ID (A-ID) is associated with one or more device IDs (DEV-ID,) and one or more enrolled credentials (fingerprints, NFC card footprint, voice attributes, passwords, patterns, etc).

A relationship ID (REL-ID) is stored in the authentication service 190 database 121 or similar persistent storage and associated with one account ID (2P ACCT-ID that identifies the account between the enterprise 130 and the authentication service 190), and one device ID (DEV-ID). The relationship ID (REL-ID) is also stored at the enterprise 130 associated with the enterprise user identity. Consequently, when the enterprise 130 is performing transactions with a user, the enterprise 130 can verify the user through the authentication service 190 credential and device verification, without relying on the user's true identity to be known by the authentication service 190. Rather, the enterprise 130 identifies the user to be authenticated using the relationship ID (REL-ID). The authentication service 190 uses the relationship ID (REL-ID) to identify the device ID (DEV-ID), which can be used to locate the account ID (A-ID) and associated user credentials, which can be verified by the authentication service 190. The establishment of these relationships enables the authentication service 190 to communicate with the user's device 101 and verify the user's credentials without knowing the true identity of the user. From a security aspect, the device information and the user credentials are segregated from the true identity of the user.

4. Secure Communications

Another important aspect of this embodiment relates to secure/encrypted communications between the parties. In this embodiment, asymmetric keys, such as PKI cryptographic keys and/or SSL are used to encrypt messages to secure communications between the various actors. As noted previously, these relationships are built on secure connections such that no one party of the three channels of communications has all the keys.

As shown in FIG. 1, there are three sets of secure connections, one corresponding to each relationship. The first is a secure connection between the customer and the authentication service. In this example, this is a secure connection 160 between a customer (enterprise 130) and the authentication service (authentication server 120). This secure connection 160 could be as simple as SSL or these communications could be encrypted using mutual key pairs.

The second secured connection is created between the independent user device 101 and the authentication server 120. In this embodiment, the user uses the user device 101 to set up an account with the authentication service using a software agent 140 downloaded to user device 101. To set up this connection, the authentication server 120 requires some credentials, such as a password, voice biometric and/or fingerprint, but does require the identity of the user. The authentication service 190 generates an asymmetric key pair D1 (PK1/PK1'), stores 215 one key (PK1) of the key pair in the device 101 and transmits the matching key (PK1') to the authentication service 190 which stores the key in association with the account ID (A-ID). Future communications between the authentication service 190 and the user device 101 can be encrypted using the one of the keys and decrypted using the matching key.

The third secure connection is between the enterprise 130 and the end user device 101. To establish this connection, a one-time code is obtained by the enterprise, and in some way (like SMS or email or presenting on a web page) communicated to the user and entered into the device 101 or captured directly be the device 101 (e.g. via a camera). After the one-time code is inputted into the device 101 an identifier, the device ID, is transmitted 235 to the authentication service 190 with the one-time code. In response to receiving the device ID and the one-time code, the authentication service 190 generates and stores 237 a relationship ID (REL-ID) that associates the device ID of the user device 101 with the account ID (2P ACCT) of the enterprise 130 whose one-time code was inputted into that device. The authentication service 190 then pushes the relationship ID 239 to the device 101 through the secure connection 180. The user device 101, using the software agent, generates another asymmetric key pair D2, stores one of the keys (PK2) 241, and transmits 243 the matching key (PK2') over the secure connection 180 to the authentication service 190. The authentication service 190 does not store the key PK2', but transmits 245 the key PK2' with the relationship ID (REL-ID) to the enterprise 130 over the secure connection 160. The enterprise 130 stores 247 the key PK2' with the relationship ID (REL-ID). Thus, three secure connections are established with the ability to encrypt/decrypt messages sent between any two of the parties.

5. Transacting Using the Authentication Service

Figure 3:
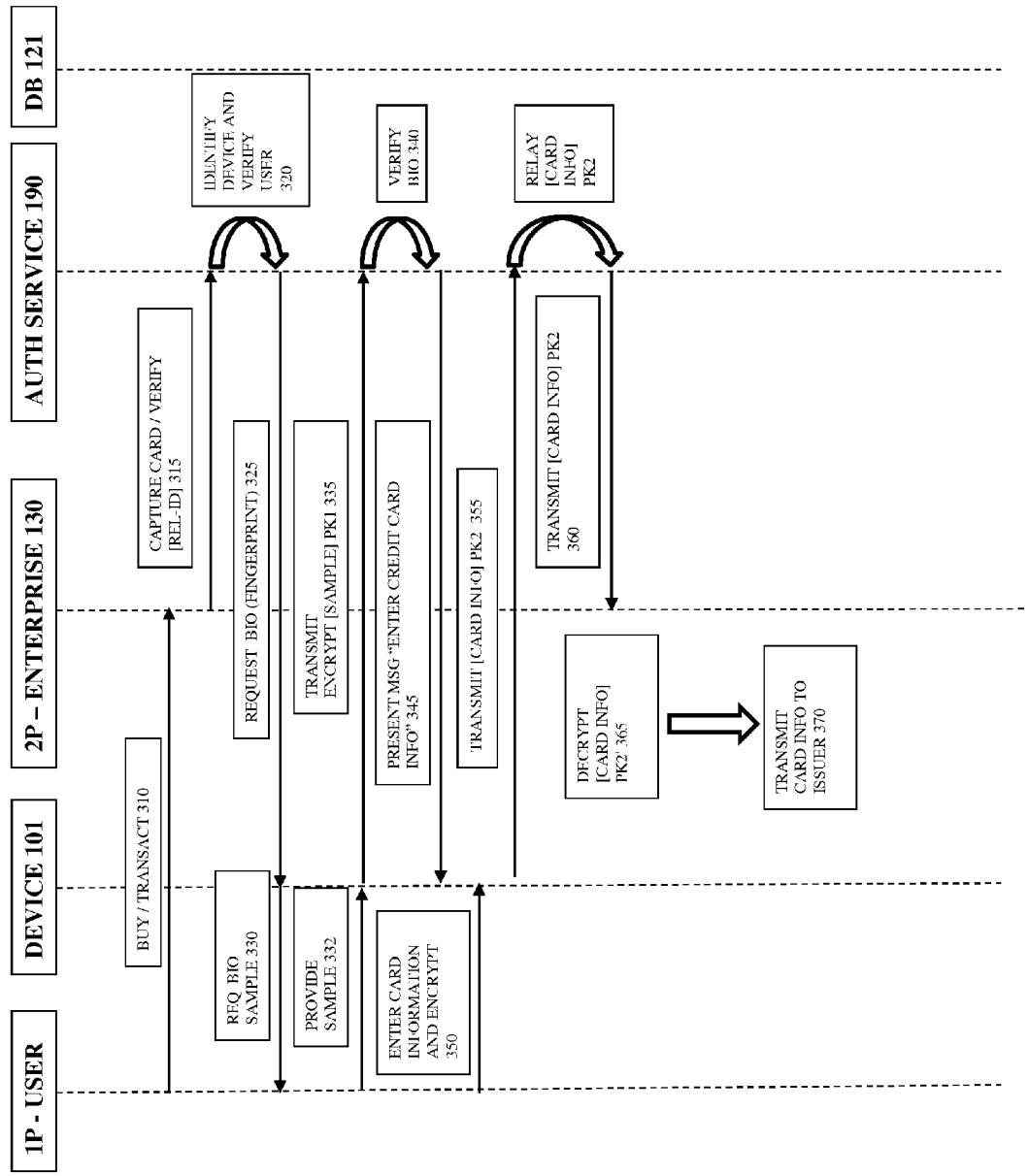
FIG. 3 shows a process of a user conducting a transaction with an enterprise using the authentication system of FIG. 1.

FIG. 3 shows an example transaction between a user and the enterprise, exemplifying how the authentication service 190, the user and the enterprise 130 interact without the authentication service 190 knowing the user's identity. This transaction also exemplifies how the information may be exchanged in an encrypted form between the user device 101 and the enterprise 130 without permitting the authentication service 190 access to the exchanged information.

Initially, the user engages the enterprise 130 to make a purchase or perform some transaction with the enterprise 130. In this case, for purposes of explanation, the user is going to make a purchase 310 using the user's credit card. The enterprise 130, in order to verify that the user is who he/she alleges to be, sends a request to the authentication service 190 to capture the credit card information and to verify the user. As a part of this request the enterprise can attach a message to the user encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used, can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best. The request includes the relationship ID (REL-ID). Using the relationship ID, the authentication service 190 identifies the device ID (DEV-ID) as well as the user's specific set of credentials, and sends a command to the device 101 in order to verify the user and capture the card information. While the authentication service 190 is capable of using any of the credentials enrolled by the user through the user device 101, in this example the authentication service 190 sends a command to the device 101 requesting a fingerprint sample 325. A message is then displayed on the user device 101 requesting a fingerprint sample 330. After the user provides the sample, for example, by placing a finger on the device sensor 332, the sample is encrypted using PK1 of the key pair D1 and this encrypted sample is transmitted 335 back to the authentication service 190, which decrypts the sample using PK1'. As noted above, in the event that the user device 101 is not configured to send the sample, but instead, performs its own verification of the sample, a result of the verification would be encrypted and transmitted back to the authentication service 190.

Here we are assuming that a sample is provided to the authentication service 190. After receiving the sample, the authentication service 190 verifies the sample 340. After the sample has been positively verified, the authentication service 190 transmits a command to the device 101 to request data entry. The device decrypts the message sent from the enterprise, in this case "ENTER CREDIT CARD INFORMATION" 345. The user then enters the credit card information 350 into the user device 101. User device 101 encrypts the credit card information using key PK2 of key pair D2 shown as [CARD INFO] PK2 and transmits 335 this information to the authentication service 190. The authentication service 190 then transmits the encrypted information to the enterprise 130 which holds the key PK2' to decrypt the credit card information. The enterprise decrypts the credit card information [CARD INFO] PK2' 365 and sends it on to the credit card issuer for processing 370.

In operation, capturing the credit card information only after verifying the credentials of the user, including biometrics, binds the user, the card and the device together in essentially real-time, to ensure the card is actually being presented by the owner, instead of being stolen. The system layers the capture of data with a set of simultaneous and in proximity, authentication. For security purposes, it's important that it has to be in the same spot, at the same time, and the human is verified before you get the information. The authentication service 190 will not take the information unless you can verify that you are who the card issuer expected you to be by presenting verifiable credentials. Another aspect of this system is that the authentication service 190 is passing encrypted information that it cannot decrypt because it does not hold the required key. This protects the user and the enterprise from not only a privacy perspective, but also from a security perspective as the authentication service 190 does not hold the keys D2.

II. Wireless Information CAPTURE and User Credential Verification

Another aspect of the present application is described with regard to the use of wireless technology, like the near field communications (NFC) module 102 of the user device 101 in conjunction with a wireless credential 103 as shown in FIG. 1. To provide for increased security and convenience, it is becoming more common for banks, etc., to issue NFC enabled credit cards (smart cards), or other wireless tokens or tags. While this embodiment is described with reference to using near field communications and NFC module 102, any low energy wireless communication, such as Bluetooth Low Energy (BLE) devices may also be utilized. In effect, these cards are readable when placed in close proximity to a reader (point of sale terminal, etc.) So, instead of physically entering account information or reading it from a magnetic strip, you tap the card on a capable device and it is read wirelessly. Because these cards, tags or tokens are not easily reproducible or copied, and because they must be in proximity to the reader, they provide a possession credential for verifying a user, entry of information wirelessly to eliminate errors, ease of use, and better security. However, since these cards can be stolen, higher security requires that the user (holder) of the card also be verified at the same time as the presentation of the card, and authenticated as the user whom the card was issued to.

Smart phones are now being developed with both wireless credential reader and emulator capabilities. Apps within your phone can emulate a wireless enabled credit card. It is now possible to tap your phone to a POS terminal and the terminal will read the phone as if it is reading a credit card wirelessly. This is known as hardware card emulation HCE. Additionally, smart phones are now available with the ability to read wireless tags or tokens (e.g. smartcards, etc.). In this embodiment, the user is verified using one type of credential, biometric, password, etc., and then after verification, the user is instructed to tap the card to the user device, the device captures the information (which itself is encrypted), which is ultimately delivered back to the enterprise for their use. The benefit of the wireless card/token is that these are unique devices that cannot be easily compromised by hackers, they require possession and proximity. That is, a user must have the actual card in their possession, and also in close proximity to the user device. The card can also provide the issuer's account information in encrypted form so that neither the user device 101 nor the enterprise 130 can view this information—they just pass it to the issuer for confirmation. Rather, in contrast to standard credit card information in which the credit card need not be present, and the credit card account information is not encrypted on the card. The use of a wireless card can provide verification (possession) as well as additional security through its own encrypted data. The synergic effect for authentication is that the user is using their own card/token on their own user device 101. This authentication provides a higher level of trust because both of these authenticators (card and user device) are non-reproducible and likely to be reported when lost or stolen. The information on these authenticators used for verification cannot be easily reproduced or emulated—in stark contrast to traditional credit card information.

Figure 4:
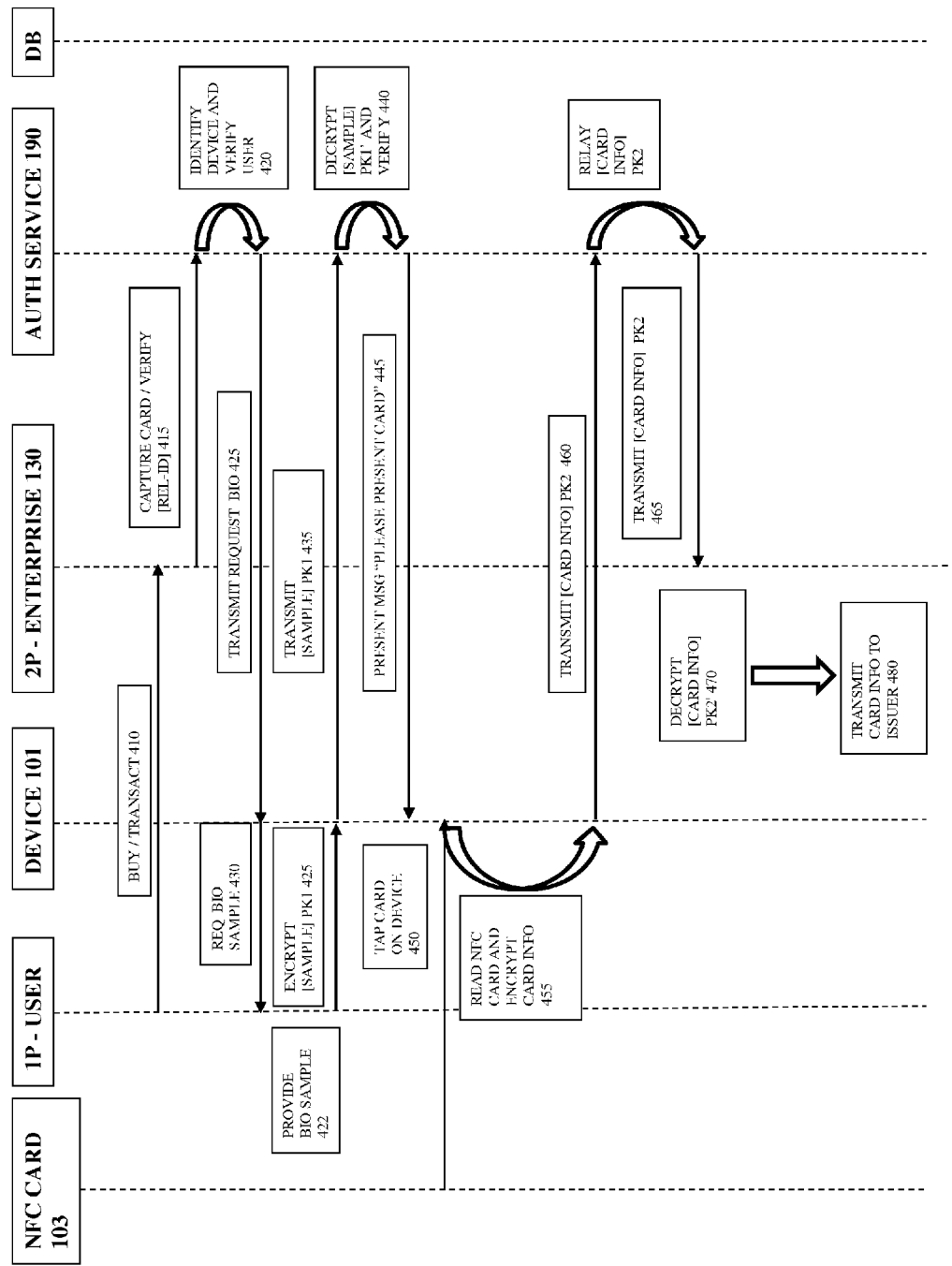
FIG. 4 shows a process of a user conducting a transaction with an enterprise using the authentication system in combination with a wireless credential.

FIG. 4 shows an example transaction between a user and the enterprise exemplifying the use of wireless credential enabled devices and smartcards to pass through account information in encrypted form.

Initially, user engages the enterprise 130 to make a purchase or perform some transaction with the enterprise 130. In this case, for purposes of explanation, the user is going to make a purchase 310 using the user's wireless credential, which is a wireless card 103 (for example, an NFC enabled credit card—but may be some other secure token). The enterprise 130, in order to verify user that the user is who he/she alleges to be, sends a request to the authentication service 190 to capture the credit card information (wireless card 103 information) and to verify the user prior to collecting the card information.

The request from the enterprise 130 includes the relationship ID (REL-ID), but may also include information from the enterprise 130 informing the authentication service 190 how to read the card/token (e.g., manufacturer's data, index data, PPSE data). As a part of this request the enterprise can attach a message to the user encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best.

Using the relationship ID, the authentication service 190 identifies the device ID (DEV-ID) and sends a command to the device 101 in order to verify the user and capture the credit card information. While the authentication service 190 is capable of using any of the credentials enrolled by the user through the user device 101, in this example, the authentication service 190 sends a command to the device 101 requesting a biometric sample 425. A message is then displayed on the user device 101 requesting a fingerprint sample 430. After the user provides the sample, for example, by placing a finger on the device sensor 422, the sample is encrypted using PK1 (shown as encrypt [sample] PK1) 425 and transmitted 435 back to the authentication service 190.

After receiving the sample, the authentication service 190 decrypts (decrypts [sample] PK1') and verifies the sample 440. After the sample has been positively verified, the authentication service 190 transmits a command to the device 101 to request wireless data capture. The device decrypts the message sent from the enterprise, in this case "PLEASE PRESENT CARD" 445, which may also include information informing the user device 101 on how to read the wireless card 103. The user then taps or locates in close proximity 450 the wireless card 103 to the user device 101. User device 101 reads and encrypts 455 the read information using key PK2 from key pair D2 shown as [CARD INFO] PK2 and transmits 460 this information to the authentication service 190. It is also noted that the account information on wireless card may be encrypted so that only the issuing authority can decrypt this information—providing an additional layer of security. The authentication service 190 then transmits 465 the wireless card 103 card information to the enterprise 130 which holds a key PK2' to decrypt the card information. The enterprise decrypts the card information [CARD INFO] PK2' 470. The card information read from the wireless card 103 may also be in encrypted form such that only the issuer of the card 103 can further decrypt this information. This encrypted account information may then be transmitted to the issuer who decrypts the information to complete the transaction.

As compared to merely entering credit card information on the user device 101, the use of a wireless wireless card 103 requires a uniquely issued card to be present and in proximity to the trusted user device 101 and only after biometrically authenticating the user. As the account information may be encrypted as well by the issuer, an additional layer of security is added in combination with increased trust of the corresponding verification.

III. Wireless CARD CHALLENGE

Another unique feature associated with a wireless enabled card is that the card possesses an intelligent chip that can be configured, in conjunction with the issuer, to have one key PK(nfc) of an asymmetric key pair (PK(nfc)/PK'(nfc)). The issuer has the other key PK'(nfc). Thus, the wireless card 103 can encrypt information. Accordingly, to add another layer of security/verification, instead of just reading the card, the card may be challenged with a value (usually random to avoid replay attacks), and the card encrypts the value with the key PK(nfc) and the encrypted value gets sent back to the issuer 135 with the challenge value. The bank (or issuer) then decrypts and verifies the challenge value, which verifies the card is truly the issued card, and provides an additional layer of security from copying or cloning a wireless smart card.

Figure 5:
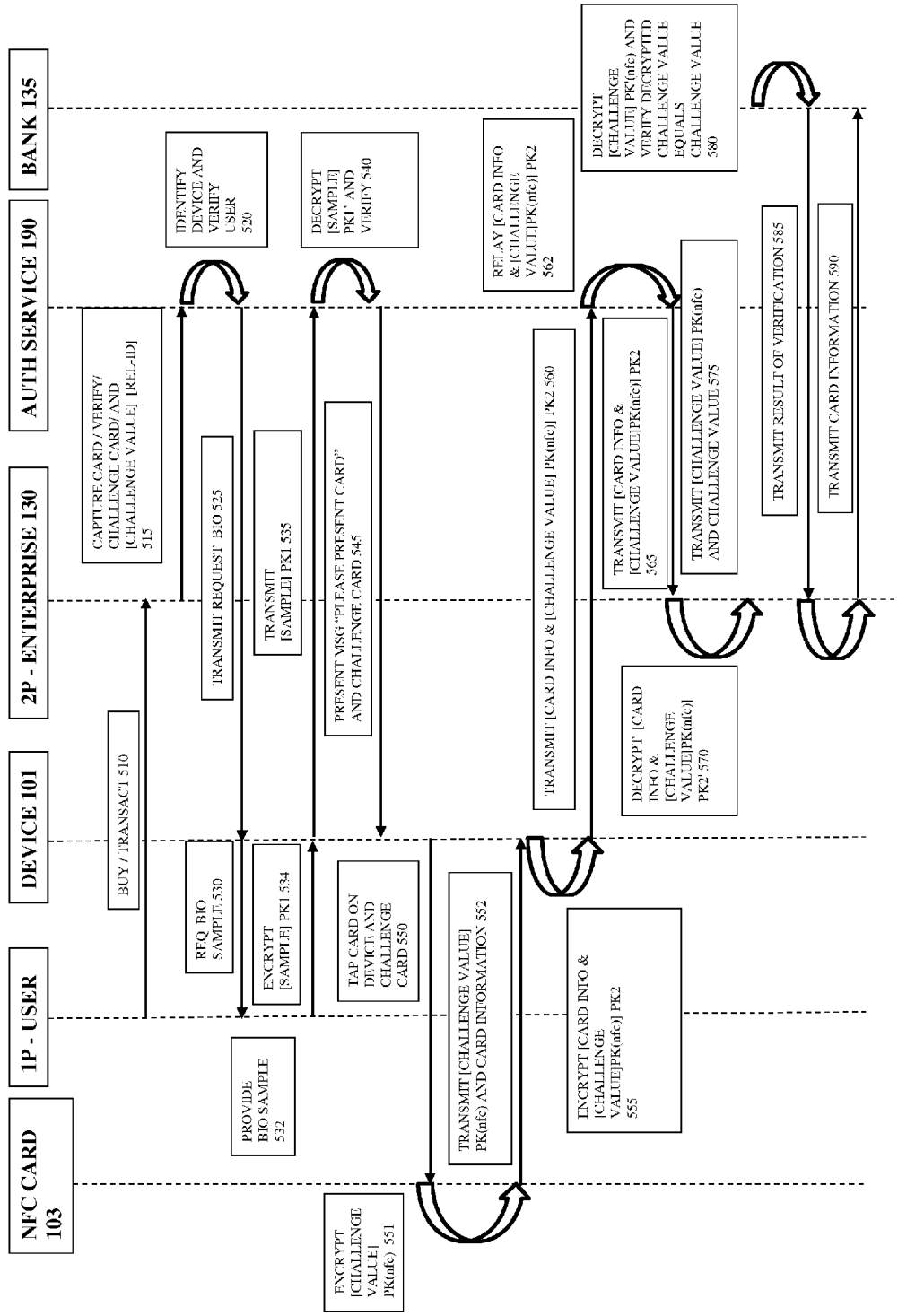
FIG. 5 shows another process of a user conducting a transaction with an enterprise using the authentication system in combination with a wireless credential challenge.

FIG. 5 shows an example transaction between a user and the enterprise exemplifying the use of wireless enabled devices and smartcards to pass through account information in encrypted form.

Initially, user engages the enterprise 130 to make a purchase or perform some transaction with the enterprise 130. In this case, for purposes of explanation, the user is going to make a purchase 510 using the user's wireless card 103 (e.g., NFC enabled credit card). The enterprise 130, in order to verify user that the user is who he/she alleges to be, sends a request to the authentication service 190 to capture the credit card information and to verify the user prior to collecting the card information. However, in this embodiment, the enterprise 130 also generates a random number (123) or a globally unique number as a challenge value, encrypts the random number [challenge value] PK2' and transmits 515 this number to the authentication service 190 with a challenge request to forward to the user device 101 after the user's credentials are verified. The request includes the relationship ID (REL-ID)), but may also include information from the enterprise 130 informing the authentication service 190 how to read the card (e.g., manufacturer's data, index data, PPSE data). As a part of this request the enterprise can attach a message to the user, encrypted using PK2' of the key pair specific to the relationship ID (REL-ID). Also as a part of this request, the enterprise can optionally specify which authentication credentials it requires the authentication service to utilize to authenticate the user. The method the enterprise uses to specify which credentials must be used, can be at any level of credential specification (category, type, attribute, or any combination). If the enterprise specification is not distinct, the authentication service will provide any missing details to distinctly determine the credential to utilize, based on the authentications service's knowledge of what the device is capable of and which credentials the authentication service believes are best. Using the relationship ID, the authentication service 190 identifies 520 the device ID (DEV-ID) as well as the user's specific set of credentials, and sends a command to the device 101 in order to verify the user. While the authentication service 190 is capable of using any of the credentials enrolled by the user through the user device 101, in this example the authentication service 190 sends a command to the device 101 requesting a biometric sample 525. A message is then displayed on the user device 101 requesting, for example, a fingerprint sample 530. After the user provides the sample by placing a finger on the device sensor 532, the sample is encrypted using a key of the key pair D1 PK1 (encrypt [sample] PK1) 534 and transmitted 535 back to the authentication service 190.

After receiving the sample, the authentication service 190 decrypts the sample using the other key of the key pair D1 (decrypts [sample] PK1') and verifies the sample 540. After the sample has been positively verified, the authentication service 190 transmits a command to the device 101 to request wireless data capture with a challenge. The device decrypts the message sent from the enterprise, in this case "PLEASE PRESENT CARD" 545 with a request to challenge the card with the challenge value from the enterprise request. The user device 101 decrypts the encrypted challenge value using key PK2 of the key pair D2 −decrypt [challenge value] PK2. The user then taps 550 the wireless card 103 on the enabled user device 101. The information on the wireless card 103 is read and the wireless card 103 is challenged using the value. The card 103 encrypts the challenge value using an embedded key PK(nfc) and transmits this to the user device 101. User device 101 reads and encrypts 555 the read information including the encrypted challenged value using key PK2 of key pair D2 (encrypt [CARD INFO +[challenge value] PK(nfc)] PK2. The user device 101 then transmits all of this information to the authentication service 190. The authentication service 190 then transmits/relays 562 the encrypted wireless card 103 information and the encrypted challenge value to the enterprise 130 which holds a key PK2' of key pair D2 to decrypt the credit card information. The enterprise decrypts the information (decrypt [CARD INFO +[challenge value] PK(nfc)] PK2') 570. The card information read from the wireless card 103 may also be in an encrypted form such that only the issuer of the card 103 can decrypt this information. Next the encrypted challenge value along with the challenge value generated by the enterprise 130 are transmitted to the issuer 135. The issuer can then decrypt the challenge value (decrypt [challenge value] PK'(nfc)) and verify 580 it is the same challenge value transmitted from the enterprise 130. If the decrypted challenge value is verified by comparison to the challenge value transmitted from the enterprise 130, the issuer 135 transmits the result back to the enterprise 585 as further verification that the system has not been compromised. In response, the enterprise 130 transmits 590 the card information back to the bank 135 or issuer of the card.

As compared to merely entering credit card information on the user device 101, the use of a wireless wireless card 103 requires a uniquely issued card to be present, in proximity to the trusted user device 101, and only after biometrically authenticating the user. As the account information may be encrypted as well by the issuer, an additional layer of security is added. The addition of using a card challenge provides an additional level of security as the random number is generated for each particular transaction providing for an additional layer of security against replay attacks.

What is claimed is:

1. A method of operating an authentication server for authenticating a user who is communicating with an enterprise via a network, comprising:
   establishing, via the network, an enterprise account with the enterprise by generating and storing an enterprise account identifier;
   establishing, via the network, a user device account with the user device by storing authentifiers received using the user device and storing the authentifiers in association with a device identifier associated with the user device;
   generating, after establishing the user device account with the user device, a first asymmetric key pair and storing one key of the first asymmetric key pair and transmitting the other key of the first asymmetric key pair to the user device;
   generating, after establishing the user device account and the enterprise account, a relationship account that associates the user device identifier and the enterprise account identifier using a relationship identifier;
   transmitting the relationship identifier to the user device;
   receiving, after transmitting the relationship identifier to the user device, one key of a second asymmetric key pair from the user device and transmitting the one key of the second asymmetric key pair to the enterprise with the relationship identifier;
   receiving, via the network, a first authenticator including first information from a low energy wireless device received via a user device wirelessly, and storing the first authenticator;
   receiving, from the enterprise, a request to authenticate he user;
   transmitting an authentication request to the user device via the network requesting that the user read information from the low energy wireless device using the user device;
   receiving, from the user device via the network, the information received from the low energy wireless device in response to the authentication request; and authenticating the user by comparing the information received from the low energy wireless device due to the authentication request with the stored first authenticator,
wherein the information received from the low energy wireless device is encrypted by the user device using the other key of the second asymmetric key pair.

2. The method of claim 1, wherein the first information from the low energy wireless device is hashed and the hashed output is stored as the authenticator as the stored authenticator; and
wherein the information received from the low energy wireless device due to the authentication request is hashed and the hashed output is compared to the hashed output stored as the authenticator to authenticate the user.

3. The method of claim 1, further comprising:
receiving, via the network, a second authenticator from the user device, and storing the second authenticator;
transmitting an authentication request to the user device via the network requesting the second authenticator; and
receiving, from the first user device via the network, an authenticator in response to the authentication request requesting the second authenticator,
authenticating the user by comparing the received second authenticator with the stored second authenticator,
wherein the authentication request transmitted to the user device via the network requesting that the user read information from the low energy wireless device using the user device is transmitted in response to the user being authenticated using the second authenticator.

4. The method of claim 3, wherein the first information from the low energy wireless device is hashed and the hashed output is stored as the authenticator as the stored authenticator; and
wherein the information received from the low energy wireless device due to the authentication request is hashed and the hashed output is compared to the hashed output stored as the authenticator to authenticate the user.

5. A method of operating an authentication server for securely exchanging information between a user device and an enterprise via a network, comprising:
receiving, via the network, a request from the enterprise to obtain information from a low energy wireless device associated with a user;
sending the request to obtain information from the low energy wireless device to the user device associated with the user;
receiving information from the low energy wireless device read using the user device, the information encrypted by the user device;
transmitting the encrypted information to the enterprise;
receiving, via the network, second information from the enterprise with a request to transmit the second information from the user device to the low energy wireless device to be encrypted using the low energy wireless device;
transmitting, via the network, the second information and the request to encrypt the second information to the user device; and
receiving the second information encrypted by the low energy wireless device; and
transmitting the encrypted second information to the enterprise.

6. The method of claim 5, further comprising:
receiving, via the network, an authenticator from the user device, and storing the authenticator;
transmitting an authentication request to the user device via the network requesting the authenticator;
receiving, from the user device via the network, an authenticator in response to the authentication request requesting the authenticator; and
authenticating the user by comparing the received authenticator with the stored authenticator,
wherein the request to obtain information from the low energy wireless device is sent in response to the user being authenticated using the authenticator received from the user device.

7. The method of claim 5, further comprising: receiving, via the network, an authenticator from the user device, and storing the authenticator; transmitting an authentication request to the user device via the network requesting the authenticator; receiving, from the user device via the network, an authenticator in response to the authentication request requesting the authenticator; and authenticating the user by comparing the received authenticator with the stored authenticator, wherein the second information and the request are transmitted to the user device in response to the user being authenticated using the authenticator received from the user device.

8. The method of claim 5, further comprising:
receiving one key of an asymmetric key pair from the user device and transmitting the one key to the enterprise without storing the one key,
wherein the second information received from the enterprise is encrypted using an other key of the asymmetric key pair and is transmitted as encrypted second information to the user device with the request.

9. The method of claim 5, further comprising: receiving one key of an asymmetric key pair from the user device and transmitting the one key to the enterprise without storing the one key, wherein the information received from the low energy wireless device read using the user device is encrypted by the user device using an other key of the asymmetric key pair.

10. The method of claim 5, further comprising:
establishing, via the network, an enterprise account with the enterprise by generating and storing an enterprise account identifier;
establishing, via the network, a user device account with the user device by storing authenticators received using the user device and storing the authenticators in association with a device identifier associated with the user device;
generating, after establishing the user device account with the user device, a first asymmetric key pair and storing one key of the first asymmetric key pair and transmitting the other key of the first asymmetric key pair to the user device;
generating, after establishing the user device account and the enterprise account, a relationship account that associates the user device identifier and the enterprise account identifier using a relationship identifier;
transmitting the relationship identifier to the user device; and
receiving, after transmitting the relationship identifier to the user device, one key of a second asymmetric key pair from the user device and transmitting the one key of the second asymmetric key pair to the enterprise with the relationship identifier, wherein the information received from the low energy wireless device is encrypted by the user device using the other key of the second asymmetric key pair.

11. The method of claim 1, wherein the user device is a mobile device and the low energy wireless device is configured to communicate using Bluetooth, near field communication or Bluetooth low energy.

12. An article of manufacture for authenticating a user who is communicating with an enterprise via a network, comprising:
a non-transitory storage medium; and
logic stored on the storage medium, wherein the stored logic is configured to be readable by a processor and thereby causes the processor to operation so as to:
establish, via the network, an enterprise account with the enterprise by generating and storing an enterprise account identifier;
establish, via the network, a user device account with the user device by storing authentifiers received using the user device and storing the authentifiers in association with a device identifier associated with the user device;
generate, after establishing the user device account with the user device, a first asymmetric key pair and storing one key of the first asymmetric key pair and transmitting the other key of the first asymmetric key pair to the user device;
generate, after establishing the user device account and the enterprise account, a relationship account that associates the user device identifier and the enterprise account identifier using a relationship identifier;
transmit the relationship identifier to the user device;
receive, after transmitting the relationship identifier to the user device, one key of a second asymmetric key pair from the user device and transmitting the one key of the second asymmetric key pair to the enterprise with the relationship identifier;
receive, via the network, a first authenticator including first information from a low energy wireless device received via a user device wirelessly, and store the first authenticator;
receive, from the enterprise, a request to authenticate the user;
transmit an authentication request to the user device via the network requesting that the user read information from the low energy wireless device using the user device;
receive, from the user device via the network, the information received from the low energy wireless device in response to the authentication request; and
authenticate the user by comparing the information received from the low energy wireless device due to the authentication request with the stored first authenticator,
wherein the information received from the low energy wireless device is encrypted by the user device using the other key of the second asymmetric key pair.

13. The article of manufacture of claim 12, wherein the first information from the low energy wireless device is hashed and the hashed output is stored as the authenticator as the stored authenticator; and
wherein the information received from the low energy wireless device due to the authentication request is hashed and the hashed output is compared to the hashed output stored as the authenticator to authenticate the user.

14. The article of manufacture of claim 12, wherein the stored logic is further configured to cause the processor to operate so as to:
receive, via the network, a second authenticator from the user device, and store the second authenticator;
transmit an authentication request to the user device via the network requesting the second authenticator; and
receive, from the first user device via the network, an authenticator in response to the authentication request requesting the second authenticator,
authenticate the user by comparing the received second authenticator with the stored second authenticator,
wherein the authentication request transmitted to the user device via the network requesting that the user read information from the low energy wireless device using the user device is transmitted in response to the user being authenticated using the second authenticator.

15. The article of manufacture of claim 14, wherein the first information from the low energy wireless device is hashed and the hashed output is stored as the authenticator as the stored authenticator; and
wherein the information received from the low energy wireless device due to the authentication request is hashed and the hashed output is compared to the hashed output stored as the authenticator to authenticate the user.

16. An article of manufacture for operating an authentication server for securely exchanging information between a user device and an enterprise via a network, comprising:
a non-transitory storage medium; and
logic stored on the storage medium, wherein the stored logic is configured to be readable by a processor and thereby causes the processor to operation so as to:
receive, via the network, a request from the enterprise to obtain information from a low energy wireless device associated with a user;
send the request to obtain information from the low energy wireless device to the user device associated with the user;
receive information from the low energy wireless device read using the user device, the information encrypted by the user device;
transmit the encrypted information to the enterprise;
receive, via the network, second information from the enterprise with a request to transmit the second information from the user device to the low energy wireless device to be encrypted using the low energy wireless device;
transmit, via the network, the second information and the request to encrypt the second information to the user device; and
receive the second information encrypted by the low energy wireless device; and
transmit the encrypted second information to the enterprise.

17. The method of claim 16, wherein the stored logic is further configured to cause the processor to operate so as to:
receive, via the network, an authenticator from the user device, and storing the authenticator;
transmit an authentication request to the user device via the network requesting the authenticator;
receive, from the user device via the network, an authenticator in response to the authentication request requesting the authenticator; and
authenticate the user by comparing the received authenticator with the stored authenticator, wherein the request to obtain information from the low energy wireless device is sent in response to the user being authenticated using the authenticator received from the user device.

* * * * *